United States Patent [19]

Arnold

[11] Patent Number: 4,543,774
[45] Date of Patent: Oct. 1, 1985

[54] HARVESTING ATTACHMENT FOR STALK FRUITS STANDING IN ROWS

[75] Inventor: Rudolf Arnold, Saulgau, Fed. Rep. of Germany

[73] Assignee: Claas Saulgau GmbH, Saulgau, Fed. Rep. of Germany

[21] Appl. No.: 626,620

[22] Filed: Jul. 2, 1984

[30] Foreign Application Priority Data

Jul. 5, 1983 [DE] Fed. Rep. of Germany ....... 3324102

[51] Int. Cl.$^4$ ..................... A01D 55/18; A01D 35/26; A01D 45/02
[52] U.S. Cl. ......................................... 56/98; 56/13.6; 56/119; 56/295; 83/501
[58] Field of Search ................... 56/98, 119, 13.6, 295, 56/6; 83/501, 502, 503

[56] References Cited

U.S. PATENT DOCUMENTS 3,455,094  7/1969  Gorham ............................... 56/503
4,027,463  6/1977  Takahashi et al. .................... 56/13.6
4,090,346  5/1978  Doi ....................................... 56/13.6

OTHER PUBLICATIONS

Hesston, "Disc Cutoff Forage Heads 1 and 2 Row Assembly, Instructions and Operator's Manual", 1982.

Primary Examiner—Robert Peshock
Assistant Examiner—David I. Tarnoff
Attorney, Agent, or Firm—Michael J. Striker

[57] ABSTRACT

An attachment for a field chopping machine has a cutting device arranged in a picking region of a working unit and having two cutting disks which rotate in opposite directions and arranged so that at least one of the cutting disks is turnable about an further axle which lies in a working direction of the machine normal to its pivot axle and is held in frictional engagement with the other cutting disk under the action of the spring acting on the further axle.

9 Claims, 3 Drawing Figures

HARVESTING ATTACHMENT FOR STALK FRUITS STANDING IN ROWS

BACKGROUND OF THE INVENTION

The present invention relates to a harvesting attachment for stalk fruits standing in rows, such as corn. More particularly, it will relate to a harvesting attachment which has a cutting device arranged in the picking region of at least one harvesting unit.

Attachments of the above-mentioned general type are known in the art. One of such attachments is disclosed, for example in the U.S. Pat. No. 3,455,094. It has been recognized from practice that when cutting disks of the cutting device are supported axially movably and acted upon by the force of a spring, the cutting disks can tilt in the event of the tough product or strong dirtying in the region of the cutting arrangement. This can result in splitting of the cutting edges of both cooperating cutting disks during the cutting process. Thereby the cutting output is considerably worsened and stoppage takes place during picking up the stalk fruits as a result of this phenomenon.

SUMMARY OF THE INVENTION

Accordingly, it is an object of the present invention to provide a harvesting attachment for stalk fruits standing in rows, which avoids the disadvantages of the prior art.

More particularly, it is an object of the present invention to provide a harvesting attachment for stalk fruits in rows, which is improved as compared with the known attachments in that in each case a frictional engagement between the partially overlapping cutting edges of both cutting disks is maintained during the cutting process and thereby the cutting output is maintained, and at the same time the automatic adjustment of the pressing force of both cutting disks relative to one another is provided.

In keeping with these objects and with others which will become apparent hereinafter, one feature of the present invention resides, briefly stated, in a harvesting attachment for stalk fruits standing in rows, in which at least one cutting disk of a cutting device is arranged turnable about a further axle which lies in a working direction of the machine normal to its pivot axle and is held in a frictional engagement with the other cutting disk under the action of a spring acting upon the further axle.

When the attachment is designed in accordance these features, it eliminates the disadvantages of the prior art attachments and achieves the above-mentioned high advantageous results.

The novel features which are considered as characteristic for the invention are set forth in particular in the appended claims. The invention itself, however, both as to its construction and its method of operation, together with additional objects and advantages thereof, will be vest understood from the following description of specific embodiments when read in connection with the accompanying drawing.

DESCRIPTION OF THE PREFERRED EMBODIMENT

Figure 1:
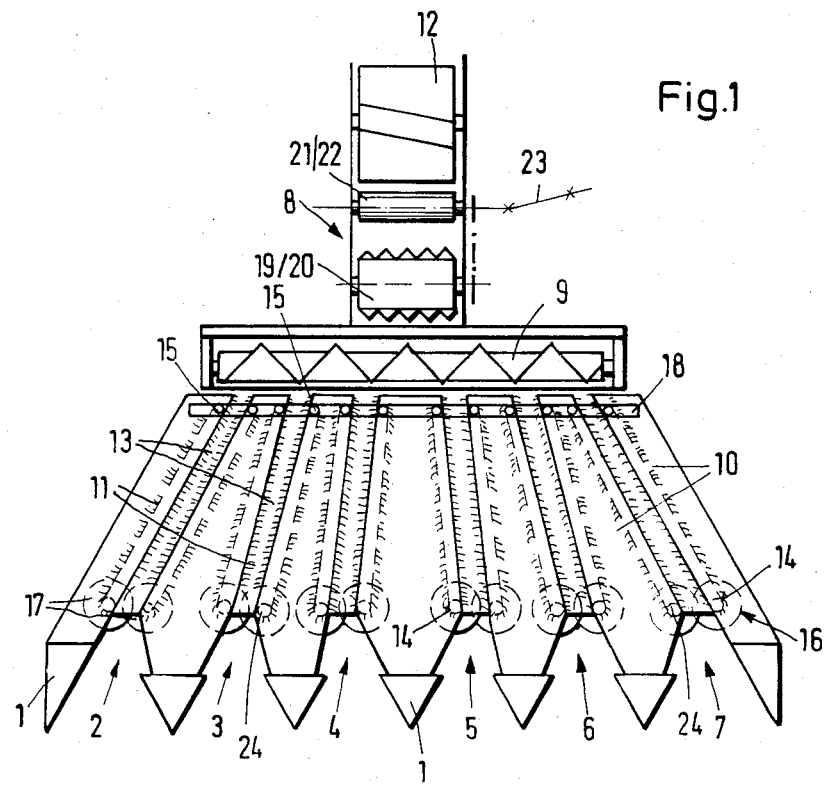
FIG. 1 is a plan view of an attachment for stalk fruits standing in rows, such as corn, in accordance with the applicant's invention.

An attachment of a field chopping machine for picking and transporting stalk fruits standing in rows, such as corn is shown in FIG. 1. The attachment has several transporting passages or harvesting units, 2, 3, 4, 5, 6, 7 which are laterally limited by stalk dividers 1. The transporting passages 2–7 are located directly before a transverse transporting screw 9 which is arranged before a drawing passage 8 of a chopping machine 12.

Transporting elements 11 extend through the transporting passages 2–7. The transporting elements 11 are associated with drivers 10 and formed as roller chains rotating around two deviating rollers 14 and 15 with front rotary axles 24. The transporting passages 2–7 are limited from below by transporting bottoms 13. A cutting device 16 for separating of the standing stalk fruits from their roots is associated with each transporting passage or unit 2–7 in the product picking region. The cutting device includes a pair of cutting disks 17 which are driven in rotation in opposite directions and cooperate with one another. The cutting disks 17 are fixedly connected with the pivot axles 24 of the respective deviating rollers 14 and are driven in rotation via the same.

The transporting elements 11 are driven from a main drive shaft or transverse shaft 18 which is located in a rear region of the attachment under the transporting bottom 13 of the transporting passages 2–7 and connected via a not shown bevel gear with the shafts of the rear deviating rollers 15 of the transporting elements. The main drive shaft 18 is driven from a not shown central drive of the machine via not shown drive connection. Transporting elements 19, 20, 21, 22 in the drawing passage 8 are also driven from the central drive of the machine for example via universal joint shafts 23 and roller chains. Finally, a cutter of a chopper 12, cooperating with a stationary counter cutter, is also driven from the central drive of the machine. The chopper 12 can be associated in a known warmer with a chassis of a pulled or self-propelled machine.

Figure 2:
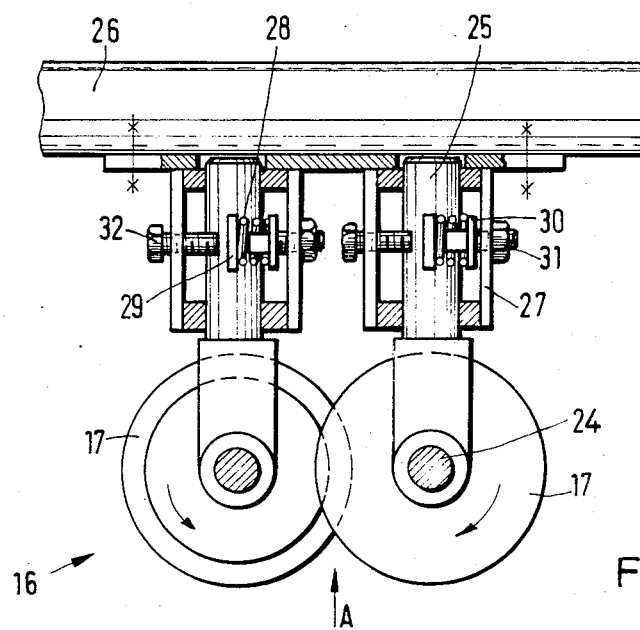
FIG. 2 is a partial view of a cutting device of the inventive attachment, on an enlarged scale.
Figure 3:
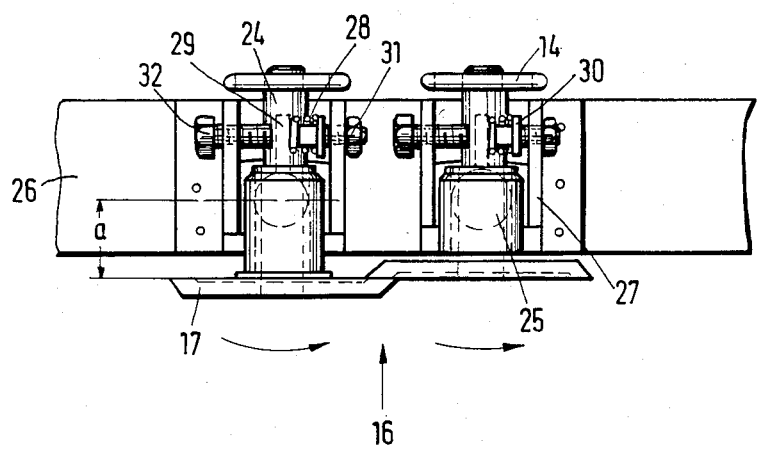
FIG. 3 is a partial view as seen in direction A in FIG. 2.

FIGS. 2 and 3 show that each cutting disk 17 is supported in a bearing block 27 on a machine frame 26, rotatably about an axle 25 which lies in working direction of the machine in a direction normal to its pivot axle 24. Each cutting disk 17 is held in frictional engagement with the other cutting disk 17 via a spring 28 acting on the pivot axle 25. The spring 28 engages a lever 29 on the pivot axle 25 and is supported on a collar 30 of an abutment screw 31 which is adjustably screwable in the bearing block 27. A further abutment screw 32 is adjustably screwed in the bearing block 27 at its side opposite to the abutment screw 31. The abutment screw 32 serves as a second abutment for the lever 29 on the pivot axle 25.

The abutment screws 32 are designed so that the cutting disks 17 in their cutting region are held in a constantly pressed condition against one another by the springs 28. Therefore during wear of the cutting disks 17 their position relative to one another must not be continuously adjusted.

Each cutting disk 17 is arranged viewed in direction of its pivot axle 24 at an axial distance a from the pivot axle 25. As can be seen from the drawing, the cutting edges of the cutting disks 17 partially overlap one another.

It will be understood that each of the elements described above, or two or more together, may also find a useful application in other types of constructions differing from the types described above.

While the invention has been illustrated and described as embodied in an attachment of field chopping machine for picking and transporting stalk products standing in rows, it is not intended to be limited to the details shown, since various modifications and structural changes may be made without departing in any from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. An attachment for stalk fruits standing in rows, such as corn, comprising at least one working unit having a picking region; and a cutting device arranged in such picking region of said working unit, said cutting device including two cutting disks rotatable in opposite directions about pivot axles and having partially overlapping cutting edges, at least one of said cutting disks being turnable about a further axle which lies in a working direction of the machine normal to its pivot axle and being held in a frictional engagement with the other of said cutting disks by spring-biasing of the said further axle of said one cutting disk.

2. An attachment as defined in claim 1; and further comprising a machine frane, said one cutting disk being turnably supported on said machine frame.

3. An attachment as defined in claim 1; and further comprising a spring which acts on said further pivot axle of said one cutting disk so as to hold it in a frictional engagement with said other cutting disk.

4. An attachment as defined in claim 1; and further comprising a lever connected with said further pivot axle, and a spring acting on said lever in sense of a turning movement.

5. An attachment as defined in claim 4; and further comprising a machine frame, said spring which acts on said lever being connected with said frame.

6. An attachment as defined in claim 1, wherein the said one cutting disk is arranged with an axial distance from said further pivot axle.

7. An attachment as defined in claim 1, wherein said further axle being turnable over a limited path; and further comprising means limiting the turning of said further axle.

8. An attachment as defined in claim 7, wherein said means for limiting include at least one abutment member.

9. An attachment as defined in claim 7, wherein means for limiting include two abutment members.

* * * * *